(12) United States Patent
Roberts et al.

(10) Patent No.: US 8,291,451 B2
(45) Date of Patent: Oct. 16, 2012

(54) PROVIDING DYNAMIC INFORMATION REGARDING A VIDEO PROGRAM

(75) Inventors: Brian F. Roberts, Dallas, TX (US);
Japan A. Mehta, Irving, TX (US);
Shahzaib Zafar, Coppell, TX (US);
Heath Stallings, Colleyville, TX (US);
Donald H. Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 375 days.

(21) Appl. No.: 12/344,114

(22) Filed: Dec. 24, 2008

(65) Prior Publication Data

US 2010/0162343 A1 Jun. 24, 2010

(51) Int. Cl.
*H04H 60/33* (2008.01)
*G06F 3/00* (2006.01)
*G06F 13/00* (2006.01)
*H04N 5/445* (2011.01)

(52) U.S. Cl. .................. 725/40; 725/9; 725/37; 725/51; 725/53

(58) Field of Classification Search ..................... 725/35
See application file for complete search history.

(56) References Cited

U.S. PATENT DOCUMENTS

| | | |
|---|---|---|
| 6,931,451 B1 | 8/2005 | Logan et al. |
| 2002/0088009 A1* | 7/2002 | Dukiewicz et al. ........... 725/136 |
| 2002/0120925 A1 | 8/2002 | Logan |
| 2006/0015902 A1* | 1/2006 | Matsuura et al. ............... 725/46 |
| 2006/0218583 A1 | 9/2006 | Vanparijs et al. |
| 2007/0016931 A1* | 1/2007 | Ichioka et al. .................. 725/46 |
| 2008/0028074 A1* | 1/2008 | Ludvig ......................... 709/226 |
| 2008/0066100 A1* | 3/2008 | Brodersen et al. .............. 725/35 |
| 2008/0141326 A1* | 6/2008 | Thompson et al. ........... 725/118 |
| 2009/0018898 A1* | 1/2009 | Genen ............................. 705/10 |

OTHER PUBLICATIONS

Wikipedia; "Pop-up Video"; http://en.widipedia.org/wiki/Pop-up_Video; Nov. 19, 2008; 6 pages.

* cited by examiner

*Primary Examiner* — Justin Shepard

(57) ABSTRACT

A device, connected to a video display device, may receive a media stream that includes a video signal associated with a video program and program meta-data associated with the video program. The device may parse the media stream to extract the program meta-data, identify a keyword based on the program meta-data, obtain information from a search performed using the keyword, create a snippet of information from the obtained information, and present the snippet and the video program to the video display device, where the snippet and the video program are concurrently presented on the video display device.

19 Claims, 10 Drawing Sheets

US 8,291,451 B2

PROVIDING DYNAMIC INFORMATION REGARDING A VIDEO PROGRAM

BACKGROUND

In the 1990's, VH1 aired music videos, commonly referred to as pop-up videos, that included bubbles containing information about the music videos. The bubbles would usually "pop-up" during a video, remain for a few seconds, and then disappear. The information in the bubbles typically included statistics, demographics, trivia (e.g., medical, scientific, or historical), definitions, and lists on a wide range of subjects. Some other television shows, like Lost, adopted the concept of bubbles.

The information, included in the bubbles, was collected by researchers. Television personnel integrated the information into the video signal containing the music video. In this way, the bubbles were presented whenever the music video aired. The information in the bubbles was static so that the same information was presented within the bubbles each time the music video aired.

DETAILED DESCRIPTION OF PREFERRED EMBODIMENTS

The following detailed description refers to the accompanying drawings. The same reference numbers in different drawings may identify the same or similar elements.

Implementations described herein may provide dynamic information associated with a video program. As used herein, the term "program" is intended to be broadly interpreted to include any form of visual content for which dynamic information may be provided, such as live content (e.g., broadcasted or streamed content), on-demand content (e.g., games, videos (including music videos), etc.), or recorded content (e.g., content recorded by a digital video recorder (DVR)).

Figure 1:
FIG. 1 is a diagram that illustrates an overview of an implementation described herein.

FIG. 1 is a diagram that illustrates an overview of an implementation described herein. As shown in FIG. 1, an information object 110 may be presented overlaid on top of a video program. Information object 110 may be presented overlaid on the video program for a threshold (e.g., user-configurable) amount of time. After expiration of the threshold amount of time, information object 110 may disappear (i.e., may no longer be displayed). Alternatively, information object 110 may be presented in a frame or window alongside the video program, rather than being overlaid on top of the video program.

The content of information object 110 may relate to the video program in some manner. For example, the content of information object 110 may relate to a topic of the video program, an actor or actress included in the video program, a location at which the video program is based, an air date of the video program, a writer, director, or producer of the video program, an opportunity relating to the video program (e.g., a product or service that may be purchased, or additional content that may be available for viewing, such as on demand content or content on another channel or airing at a later date), or some other information associated with the video program. The information in information object 110 may be dynamic in the sense that it may be generated on-the-fly whenever a user tunes his video client (e.g., set top box) to present the video program. For example, when the video client is set to present the video program, the video client may obtain meta-data associated with the video program. The video client may use this meta-data to obtain information associated with the video program.

As shown in FIG. 1, assume that the video program is a television program starring Jennifer Anniston. The video client may determine, from meta-data associated with the video program, that Jennifer Anniston is an actress starring in the video program. The video client may, for example, perform a search to obtain information relating to Jennifer Anniston. The video client may then populate information object 110 with a fact relating to Jennifer Anniston, such as that Jennifer Anniston also starred in the television series Friends. The video client may present information object 110 overlaid on the video program for a threshold amount of time.

In the description to follow, dynamic information will be described in connection with television programs. It should be understood, however, that the description equally applies to other types of programs.

Figure 2:
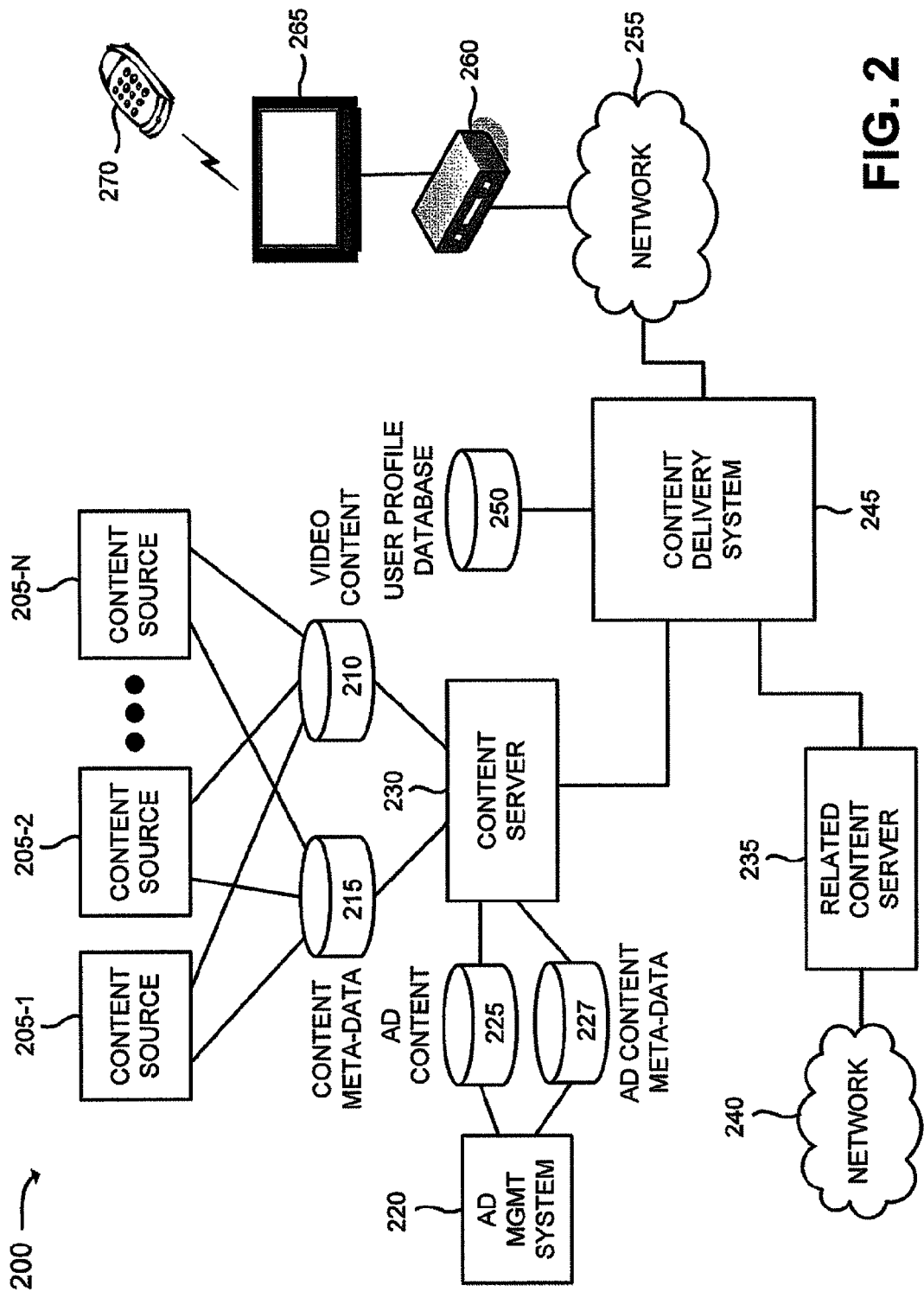
FIG. 2 is a diagram of an exemplary environment in which systems and methods described herein may be implemented.

FIG. 2 is a diagram of an exemplary environment 200 in which systems and methods described herein may be implemented. Environment 200 may include content sources 205-1, 205-2, ..., 205-N (where N>1) (collectively referred to as "content sources 205," and individually as "content source 205"), video content database 210, content meta-data database 215, advertising (ad) management (mgmt) system 220, advertising content database 225, advertising content meta-data database 227, content server 230, related content server 235, network 240, content delivery system 245, user profile database 250, network 255, video client 260, video display device 265, and remote control 270. In practice, environment 200 may include more, fewer, different, or differently arranged devices than are shown in FIG. 2. Also, two or more of these devices may be implemented within a single device, or a single device may be implemented as multiple, distributed devices. Further, while FIG. 2 shows direct connections between various devices, any of these connections can be indirectly made via a network, such as a local area network, a wide area network (e.g., the Internet), a telephone network (e.g., the Public Switched Telephone Network (PSTN) or a cellular network), or a combination of networks.

Content sources 205 may include any type or form of content provider. For example, content sources 205 may include free television broadcasters (e.g., local broadcasters, such as NBC, CBS, ABC, and Fox), for-pay television broadcasters (e.g., TNT, ESPN, HBO, Cinemax, CNN, etc.), and/or web-based content providers (e.g., streaming content from web sites). Video content database 210 may store video signals representing the video programs provided by various ones of content sources 205. Content meta-data database 215 may store meta-data associated with the video programs provided by various ones of content sources 205. The meta-data might include program descriptions, program line-ups and/or schedules, or other information associated with the video programs in video content database 210.

Advertising management system 220 may control what advertising content is presented in connection with the video programs in video content database 210. Advertising management system 220 may store advertising content in advertising content database 225. The advertising content may include advertisements (e.g., commercials that are inserted within a program signal, long form advertisements that are not inserted within the program signal, text or graphics that are overlaid on or presented with a program description, advertisements that are presented alongside the program signal, and/or interactive advertisements), and/or links to advertisements that may be served via a network, such as the Internet. Advertising content meta-data database 227 may store meta-data associated with the advertisements in advertising content database 225. The meta-data might include scheduling information, rating information, category information, length of advertisement, classification information, expiration date of the advertisement, or other information that advertising management system 220 and/or content server 230 may find useful in serving and/or targeting the advertising content.

Content server 230 may include a device that is capable of controlling the serving of video programs from video content database 210, the program meta-data from content meta-data database 215, and/or the advertising content from advertising content database 225. In one implementation, content server 230 may include a content mixing engine to select information, such as video programs, program meta-data, advertising content, and/or advertisement meta-data, and mix the information together. Content server 230 may optionally also perform transcoding of the mixed information. Content server 230 may transmit the mixed information as a media stream to video clients, such as video client 260.

In one implementation, content server 230 may embed program meta-data in the media signal to create an enhanced media stream. Content server 230 may use a technology, such as the Enhanced Television (ETV) Binary Interchange Format (EBIF) developed under the OpenCable project of Cable Television Laboratories, Inc. to embed and/or transmit the program meta-data. EBIF is a technology that may be used to embed, transmit, parse, and/or render information in a media stream. Content server 230 may output EBIF-compliant content and signaling information, which may be used to parse and/or render the EBIF-compliant content. While the description herein will focus on EBIF, other technologies may be used to embed, transmit, parse, and/or render the program meta-data in other implementations.

Related content server 235 may include a device that is capable of searching for and/or managing the serving of information related to program meta-data associated with a video program. Related content server 235 may retrieve related content from network 240. Network 240 may include a wide area network, such as the Internet. Related content server 235 may perform a search for information on, or otherwise obtain information from, devices (not shown) connected to network 240. In an alternative implementation, related content server 235 may connect to a database (not shown) that may store information related to program meta-data associated with a video program. While FIG. 2 shows related content server 235 connected to video client 260 via content delivery system 245, in another implementation, related content server 235 may connect to video client 260 in another manner.

Content delivery system 245 may include a device that is capable of delivering information to a user's equipment (e.g., a user's video client 260). Content delivery system 245 may include a service adaptor component and a media relay component. The service adaptor component may control what information (e.g., what video programs and/or advertisements) to provide to which users based, for example, on user subscriptions and/or profiles. Content delivery system 245 may also include one or more on demand components that may provide on demand services (e.g., music, video, and/or games on demand). The media relay component may control the transmission of the information to the users. The media relay component may perform encoding and/or encryption functions.

User profile database 250 may store information associated with various users, such as preferences of the users, information regarding the video programs that the users selected to watch and/or record, information regarding social groups with which the users are associated and possibly preferences and/or viewing/recording habits of members of the social groups, information regarding interactive content selected by the users, and/or other information that might be useful in presenting information to the users. In one implementation, user profile database 250 may not only include information regarding social groups, but also may identify which video programs the members of the social group are watching. This information may be obtained for user profile database 250 from feedback from video clients 260 used by members of the social group.

Network 255 may include a video signaling and distribution network to distribute the information from content delivery system 245. Network 255 may take the form of a wide area network, a local area network, an intranet, a telephone network (e.g., the Public Switched Telephone Network or a cellular network), a private network, an optical fiber network, a satellite network, or a combination of networks.

Video client 260 may include a device capable of receiving and processing the information from content delivery system 245 for display on video display device 265. In one implementation, video client 260 may take the form of a set top box. In another implementation, video client 260 may include a computer device, a cable card, a stationary communication device (e.g., a POTS telephone), a portable communication device (e.g., a mobile telephone or a personal digital assistant (PDA)), or the like. Video client 260 may perform decoding and/or decryption functions on information received from content delivery system 245.

Video display device 265 may include a device capable of receiving and reproducing video signals (and perhaps audio signals). In one implementation, video display device 265 may take the form of a television. In another implementation, video display device 265 may include a computer monitor, a display of a stationary communication device (e.g., a POTS telephone) or a portable communication device (e.g., a mobile telephone or a PDA), or the like.

Remote control 270 may include a device capable of remotely controlling the operation of video client 260 and/or video display device 265. Remote control 270 may transmit infrared signals, or another type of signal, to a reader associated with video client 260 and/or video display device 265.

Figure 3:
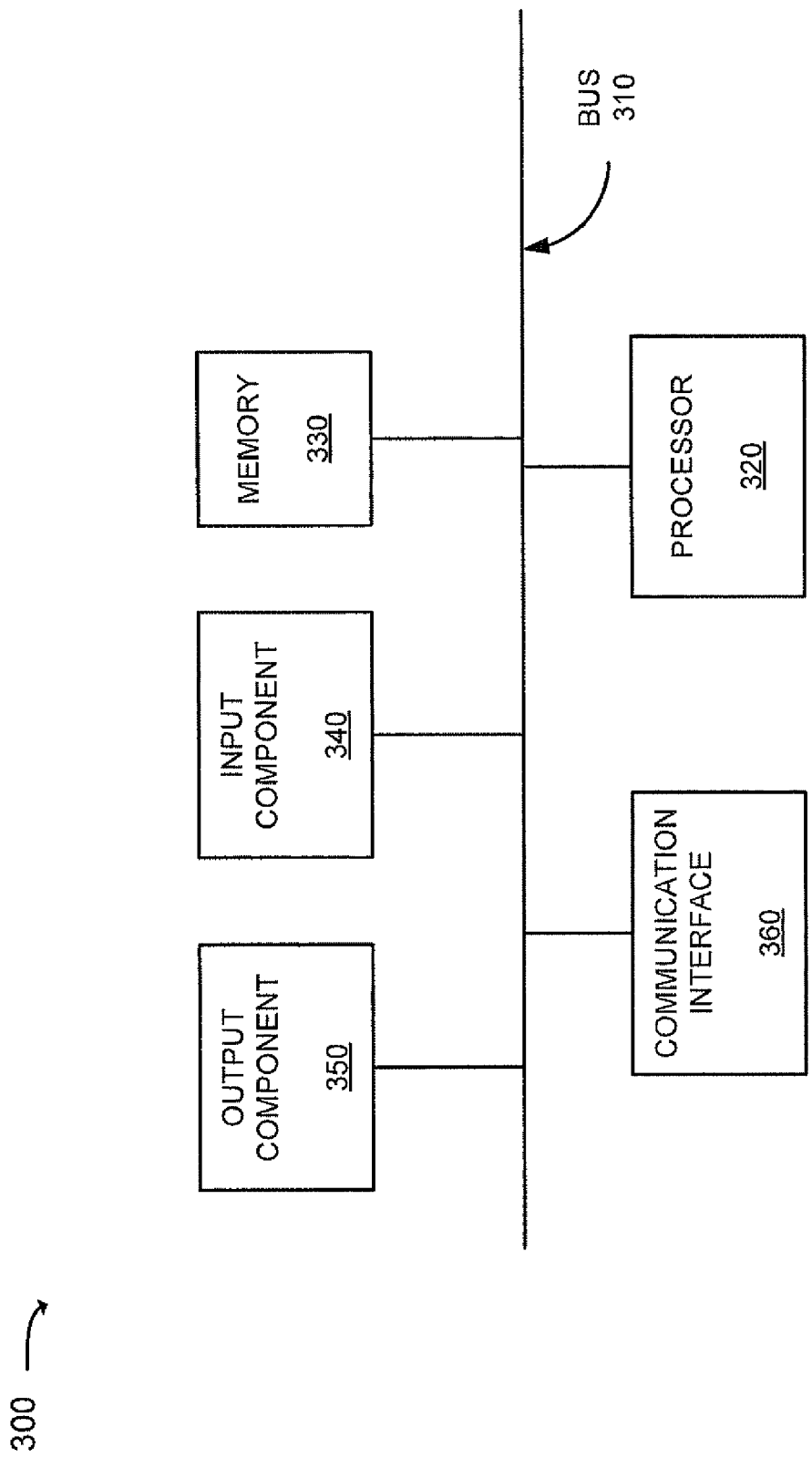
FIG. 3 is a diagram of exemplary components of a device of FIG. 2.

FIG. 3 is a diagram of exemplary components of a device 300 that may correspond to advertising management system 220, content server 230, related content server 235, content delivery system 245, video client 260, and/or video display device 265. In another implementation, device 300 may include additional, fewer, different, and/or differently arranged components.

As shown in FIG. 3, device 300 may include a bus 310, a processor 320, a memory 330, an input component 340, an output component 350, and a communication interface 360. Bus 310 may include a path that permits communication among the components of device 300.

Processor 320 may include a processor, microprocessor, or processing logic (e.g., an application specific integrated circuit (ASIC) or a field programmable gate array (FPGA)) that may interpret and execute instructions. Memory 330 may include any type of dynamic storage device that may store information and instructions for execution by processor 320, any type of non-volatile storage device that may store information for use by processor 320, and/or any type of removable memory device (e.g., flash memory).

Input component 340 may include a mechanism that permits an operator to input information to device 300, such as a keyboard, a keypad, a button, a switch, etc. Output component 350 may include a mechanism that outputs information to the operator, such as a display, a speaker, a light emitting diode (LED), etc. Communication interface 360 may include any transceiver-like mechanism that enables device 300 to communicate with other devices and/or systems. For example, communication interface 360 may include an Ethernet interface, an optical interface, a coaxial interface, a wireless interface, or the like.

As will be described in detail below, device 300 may perform certain operations relating to the presentation of information relating to a video program. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple, physical memory devices.

The software instructions may be read into memory 330 from another computer-readable medium or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Figure 4:
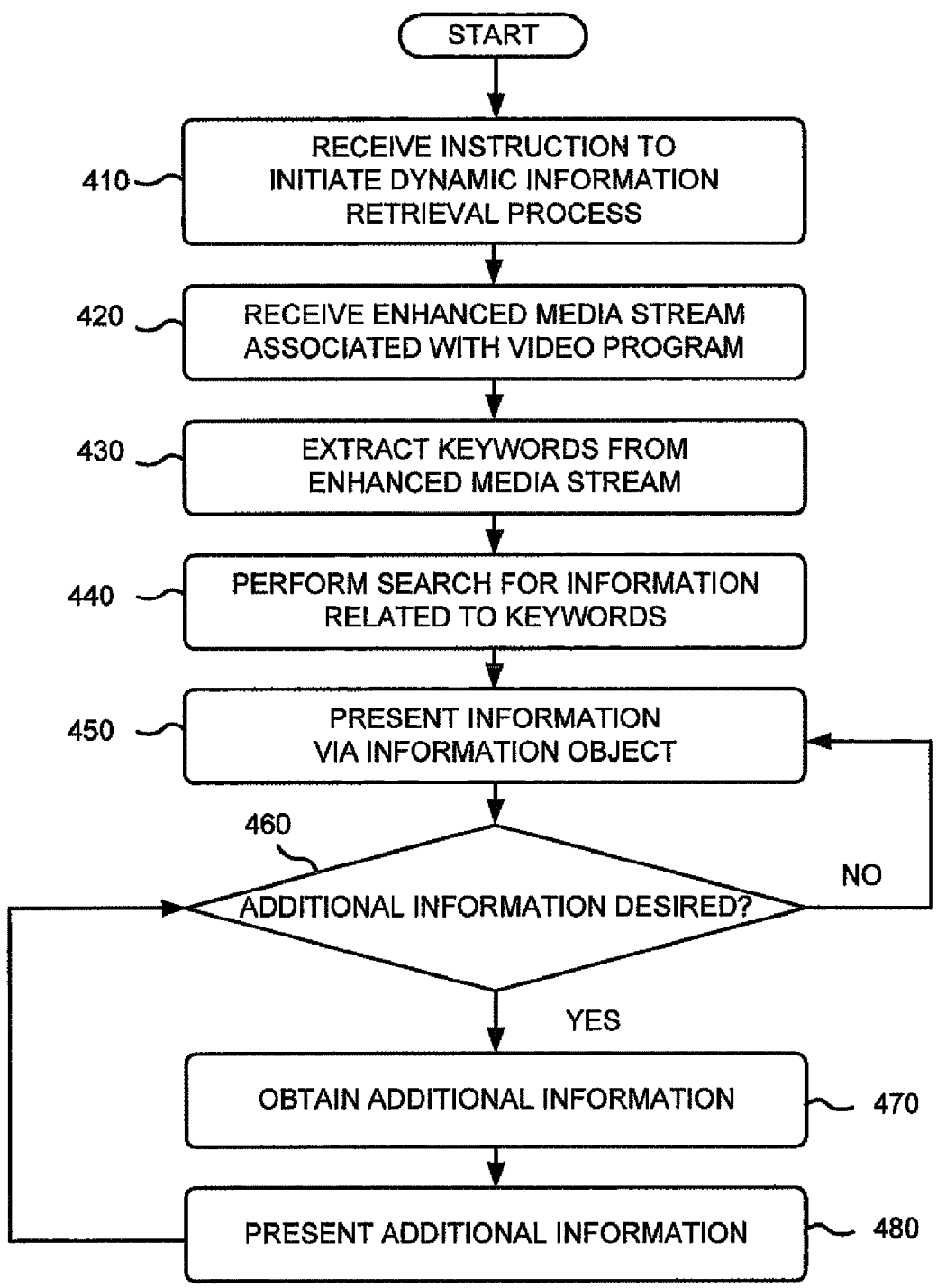
FIG. 4 is a flowchart of an exemplary process for presenting dynamic information associated with a video program.

Implementations, described herein, may provide dynamic information relating to a video program as information objects presented in connection with the video program. FIG. 4 is a flowchart of an exemplary process for presenting dynamic information associated with a video program. In one implementation, the process of FIG. 4 may be performed by video client 260, content server 230, and/or related content server 235. In another implementation, the process of FIG. 4 may be performed by one or more devices either separate from, or in combination with, video client 260, content server 230, and/or related content server 235.

The process of FIG. 4 may begin at some point after a user turns on video display device 265. An instruction to initiate the dynamic information retrieval process may be received (block 410). In one implementation, the dynamic information retrieval process may be initiated by turning on video client 260. For example, video client 260, when turned on, may automatically execute the dynamic information retrieval process.

In another implementation, a user may be permitted to turn on or off the dynamic information retrieval process. For example, video client 260 may present a user interface relating to the dynamic information retrieval process. The user may interact with this user interface of video client 260 to either turn the dynamic information retrieval process on or off. When the dynamic information retrieval process is turned on, information objects may be periodically presented in connection with video programs (as described below). When the dynamic information retrieval process is turned off, information objects may not be presented in connection with video programs. Assume, for the description to follow, that the user has turned on the dynamic information retrieval process.

Assume further that the user has instructed video client 260 to present a video program on video display device 265. There are several possible ways that the user can instruct video client 260 to present the video program. For example, the user may turn on video client 260 and video client 260 may present a video program associated with a default channel. Alternatively, the user may instruct video client 260 to present the video program by pressing a channel button or a channel change button on remote control 270. Alternatively, the user may instruct video client 260 to present the video program by selecting an item from a list of programs, such as a program guide, a recommended programs list, a recorded programs list, or the like.

An enhanced media stream associated with the video program may be received (block 420). For example, content server 230 may transmit an enhanced media stream to video client 260 via content delivery system 245. Alternatively, the enhanced media stream may correspond to recorded media data (e.g., media data recorded by a DVR) that may be played by video client 260. The enhanced media stream may, in one implementation, include a video signal associated with the video program and program meta-data associated with the video program.

Keywords may be extracted from the enhanced media stream (block 430). For example, video client 260 may use EBIF technology to parse and extract the program meta-data associated with the video program. Video client 260 may analyze the program meta-data to identify particular keywords from the program meta-data. The keywords may relate to various information regarding the video program, such as a title of the video program, a description of the video program, the names of actors and/or actresses performing within the video program, a writer, director, or producer of the video program, an air date of the video program, or the like.

A search may be performed for information related to the keywords (block 440). For example, video client 260 may provide the keywords to related content server 235. Related content server 235 may perform a search on network 240 (or in a database) to locate information based on the keywords. In one implementation, related content server 235 may perform a search of a particular web site that is known to include information that might be useful to present to a user, such as the Wikipedia web site, the Internet Movie Database (IMDB) web site, the Rotten Tomatoes web site, the Jeopardy web site, or another web site. Content server 235 may return the located information to video client 260.

Information may be presented via an information object (block 450). For example, video client 260 may create snippets of information from the information from content server 235. In one implementation, video client 260 may analyze the information, from content server 235, to identify sentences (or fractions of sentences) that contain candidate information for a snippet. Each snippet may include a statement (e.g., a particular statistic, demographic data, a piece of trivia, a definition, etc.), a question, an opportunity, or another type of information related to the program meta-data associated with the video program.

Video client 260 may present a snippet within an information object, such as a pop-up object (e.g., information object 110 (FIG. 1)), on video display device 265. In one implementation, video client 260 may modify the video signal to include the information object, and present the modified video signal for display on video display device 265. Video client 260 may cause the information object to be presented on video display device 265 for a threshold amount of time. The threshold amount of time may be user-configurable. Video client 260 may present multiple information objects during the video program. In one implementation, video client 260 may present information objects according to a set (possibly user-configurable) schedule, such as once every five minutes. In another implementation, video client 260 may present information objects constantly—replacing one information object with another information object.

The information object may permit the user to obtain additional information associated with the snippet contained in the information object (or associated with other program meta-data associated with the video program). For example, video client 260 may permit the user to press a button on remote control 270 to obtain the additional information. As shown in FIG. 1, for example, the user may press the OK button on remote control 270 to obtain the additional information.

If additional information is not desired (block 460—NO), then the information object may continue to be presented (block 450) until the threshold amount of time expires—at which time, the information object may be removed from display on video display device 265. If additional information is desired (block 460—YES), however, the additional information may be obtained (block 470). In one implementation, for example, video client 260 may use information from the information object as keywords for an additional search. In this case, video client 260 may send these keywords to related content server 235. In an alternative implementation, when the user indicates that the user desires additional information, video client 260 may present the user with program meta-data associated with the video program. The user may then select the data in which the user is interested and this data may be used as a keyword for the additional search. Related content server 235 may perform a search on network 240 (or in a database) based on the keyword(s) and return relevant information to video client 260. In another implementation, when the user indicates that the user desires additional information, video client 260 may permit the user to participate in a trivia game in which the user is asked to answer questions related to the program meta-data. In yet another implementation, when the user indicates that the user desires additional information, video client 260 may tune to a video program on another channel or schedule a video program for recording.

The additional information may be presented (block 480). For example, video client 260 may receive the relevant information from related content server 235 and may present this relevant information in additional information objects. Alternatively, video client 260 may present the relevant information via another interface that may take up a portion, or all, of the screen of video display device 265. In the situation where the relevant information is presented in an interface that takes up a portion of the screen of video display device 265, video client 260 may present the video program in a window that takes up a fraction of the size of the screen of video display device 265. In the situation where the relevant information is presented in an interface that takes up all of the screen of video display device 265, video client 260 may pause the presentation of the video program and buffer (e.g., record) the presentation in a memory for later play-back on video display device 265.

The user may be permitted to further interact with the additional information. For example, video client 260 may permit the user to perform additional searches for information of interest. Alternatively, video client 260 may permit the user to make a purchase, to view or record another video program, or perform some other activity based on the additional information. In this way, the user can obtain information related to a video program in which the user is interested. As a result, the user's video program watching experience may be improved.

In one alternative implementation, an emphasis may be placed on things that the user likes when presenting information to the user. For example, information from user profile database 250 may be used to assign higher weights to certain information than weights assigned to other information. The weights may be used to determine the order in which to present the information. For example, if the user likes a particular actress in the video program (which may be evidenced by the video programs that the user has watched or recorded in the past, or from direct input from the user), information, collected based on the program meta-data, may be prioritized to present more information regarding the actress than other information in the information objects.

Figure 5:
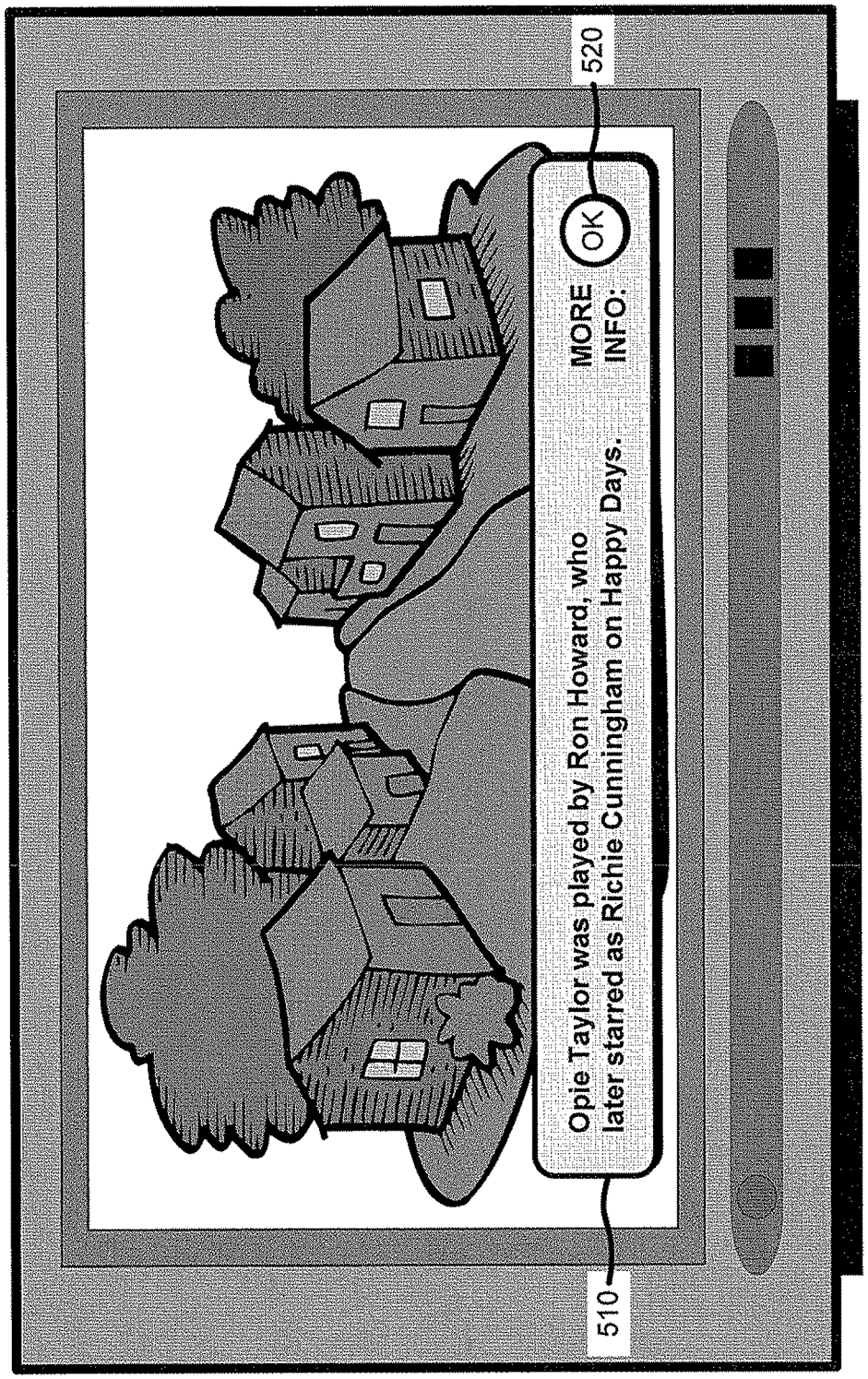
FIGS. 5-7 are diagrams of exemplary information that can be presented regarding a video program.
Figure 6:
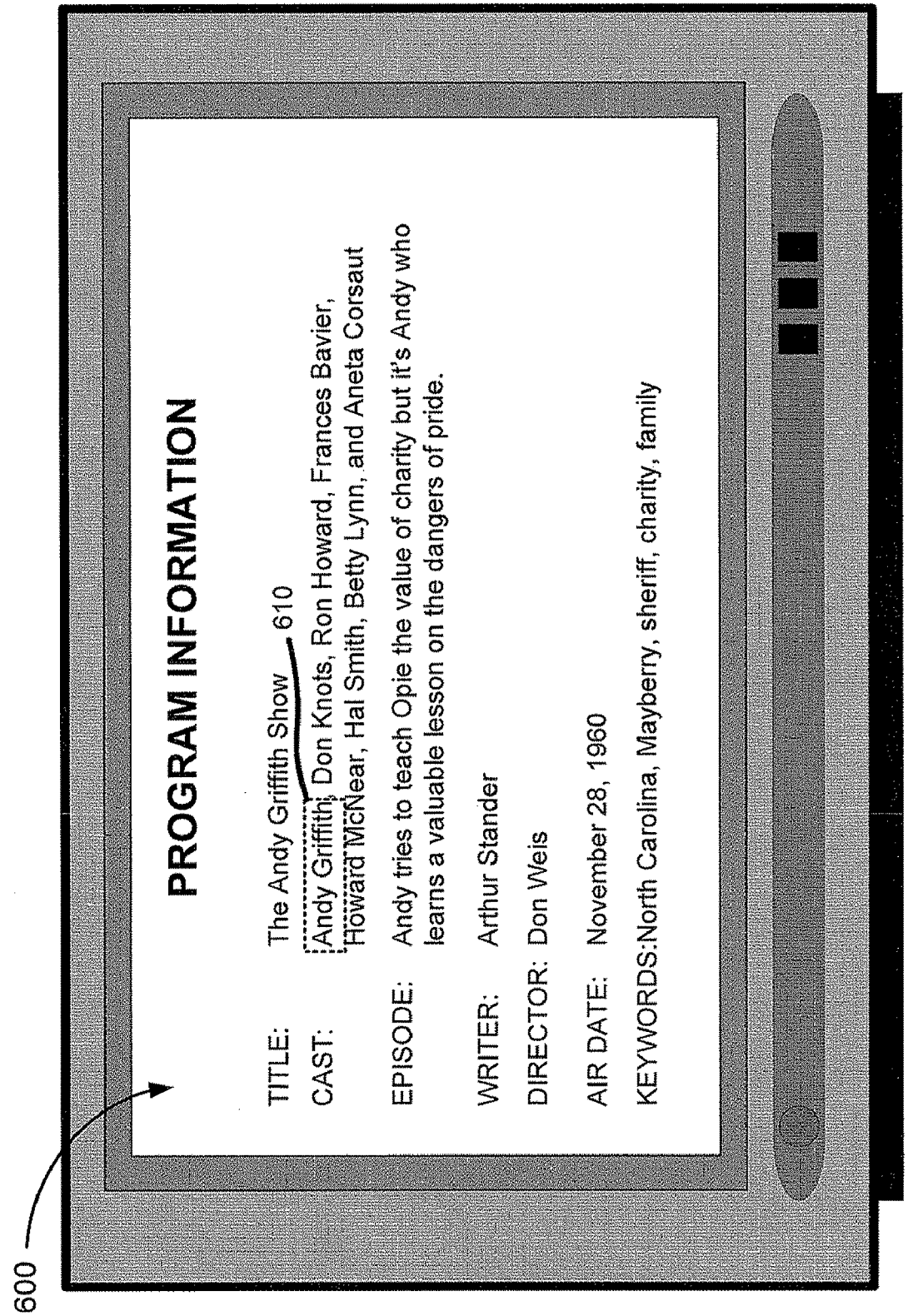
Figure 7:
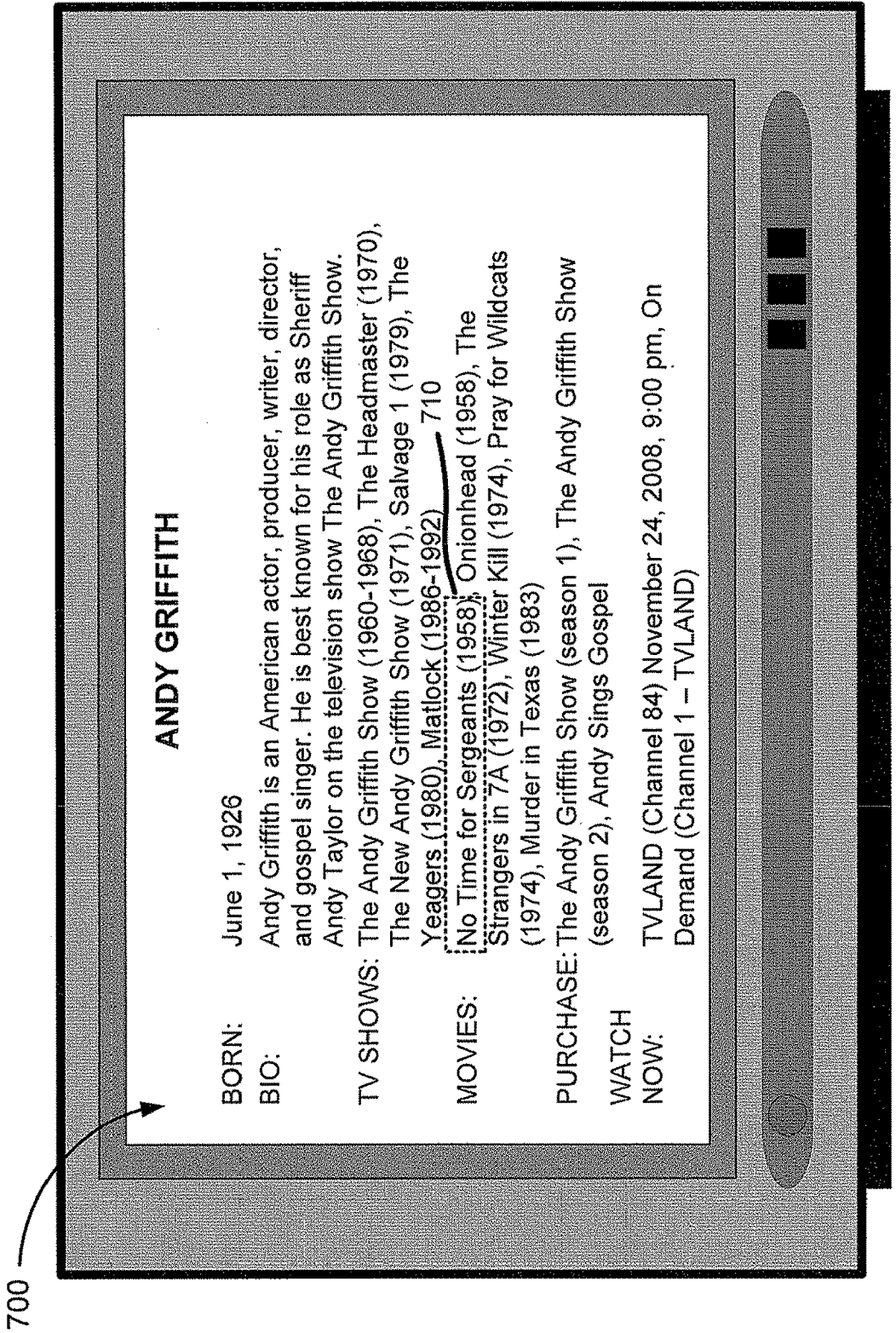

FIGS. 5-7 are diagrams of exemplary information that can be presented regarding a video program. Assume that a user instructs her video client 260 (FIG. 2) to tune to the TV Land channel, which is currently playing an episode of The Andy Griffith Show television series. Video client 260 may receive an enhanced media stream that includes the video signal corresponding to The Andy Griffith Show and program meta-data relating to the show. Video client 260 may extract the program meta-data and send the data to a server (e.g., related content server 235) to perform a search for information related to the program meta-data. Alternatively, video client 260 may perform the search itself. Video client 260 may parse the search results to form snippets of information relevant to the program meta-data.

Video client 260 may present one of the snippets on a video display device 265 via an information object. As shown in FIG. 5, video client 260 may present an information object 510 that provides a statement regarding an actor in the show (e.g., the information object indicates that Opie Taylor was played by Ron Howard, who later starred as Richie Cunningham on Happy Days). Information object 510 may also provide an option 520 to obtain additional information (e.g., press OK to get more information), as shown in FIG. 5.

Assume that the user indicates that she desires additional information by pressing the OK button on her remote control 270. Video client 270 may present the user with a program information page 600, as shown in FIG. 6. In one implementation, video client 260 may pause the presentation of the show (e.g., begin recording the show in memory).

Program information page 600 may include various information regarding the show being presented on video display device 265. As shown in FIG. 6, program information page 600 may include the title of the show, the names of the actors/actresses in the show, a description of the show, the name of the writer of the show, the name of the director of the show, an original air date of the show, and various keywords. In other implementations, program information page 600 may include additional, fewer, or different items of information.

Video display device 265 may provide a selector 610 that permits the user to identify a term (e.g., a word or a collection of words) about which the user is interested in obtaining additional information. As, shown in FIG. 6, assume that the user indicates that the user desires additional information regarding the term "Andy Griffith."

In response, video client 260 may send the term to a server to perform a search based on the term. Alternatively, video client 260 may perform the search itself. Video client 260 may parse the search results to form an information page 700, as shown in FIG. 7. Information page 700 may present various information regarding Andy Griffith, such as the year he was born, a biography (bio), the television shows and movies in which he starred, products for purchase (e.g., DVDs or downloads of television shows or movies in which he starred, audio CDs of his music, etc.), information on how the user can watch television shows or movies in which he starred. Video display device 265 may provide a selector 710 that permits the user to identify a term (e.g., a word or a collection of words) about which the user is interested in obtaining additional information. If the user selected a purchase, for example, video client 260 may provide the user with information to facilitate the purchase (e.g., take the user to a web site to facilitate the purchase). If the user selected to watch now, video client 260 may immediately tune to the channel on which the show is currently playing. Alternatively, video client 260 may schedule to record the show. Alternatively, video client 260 may set a reminder for the user to watch the show when the show airs at a later date or time.

Video client 260 may permit the user to leave program information page 600 (FIG. 6) or information page 700 (FIG. 7) at any time by pressing a particular button on remote control 270. For example, the user may press an EXIT button on remote control 270 to return to viewing the show at the point that the user left the show.

Figure 8:
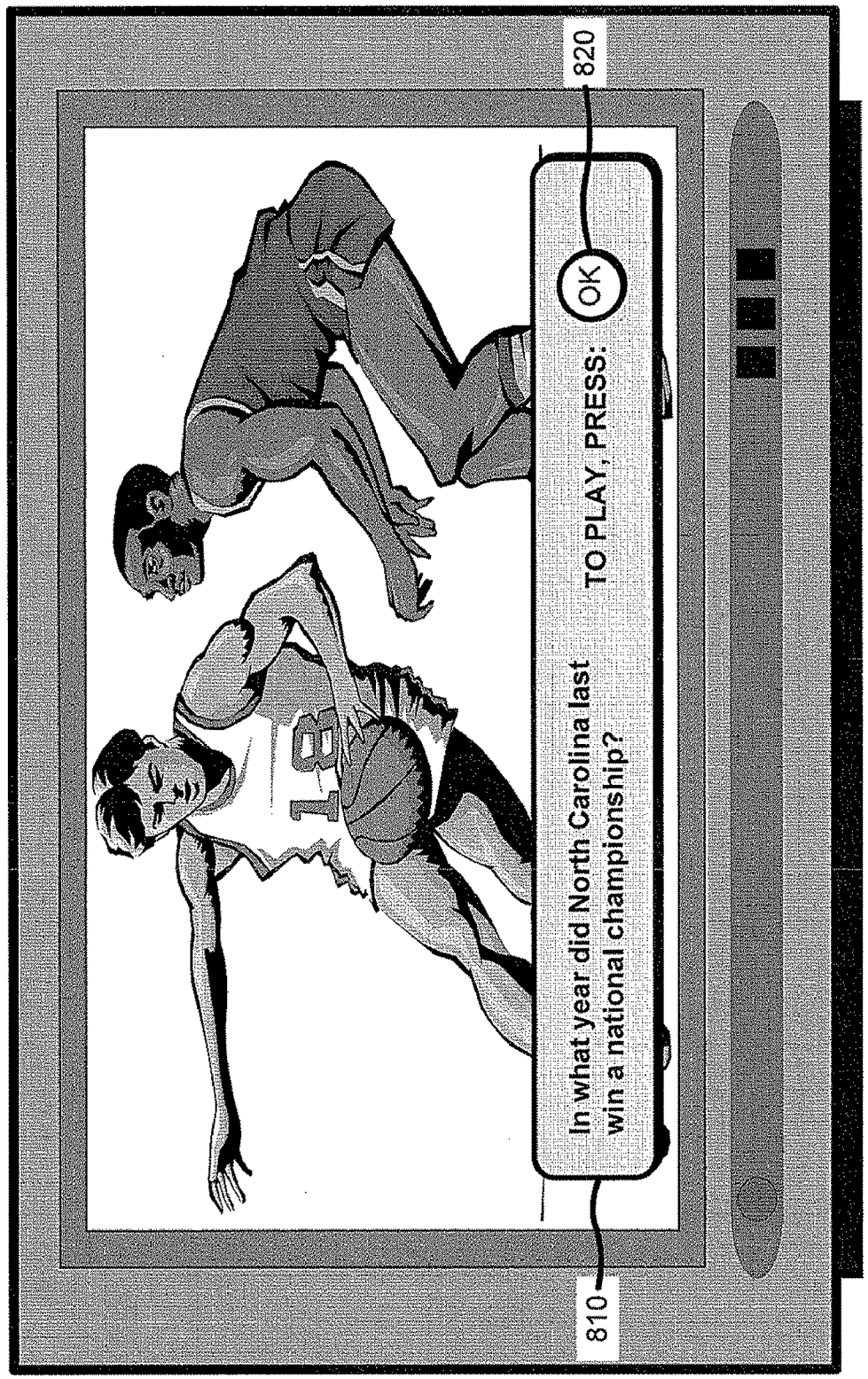
FIGS. 8-10 are diagrams of an exemplary trivia game that can be presented regarding a video program.
Figure 9:
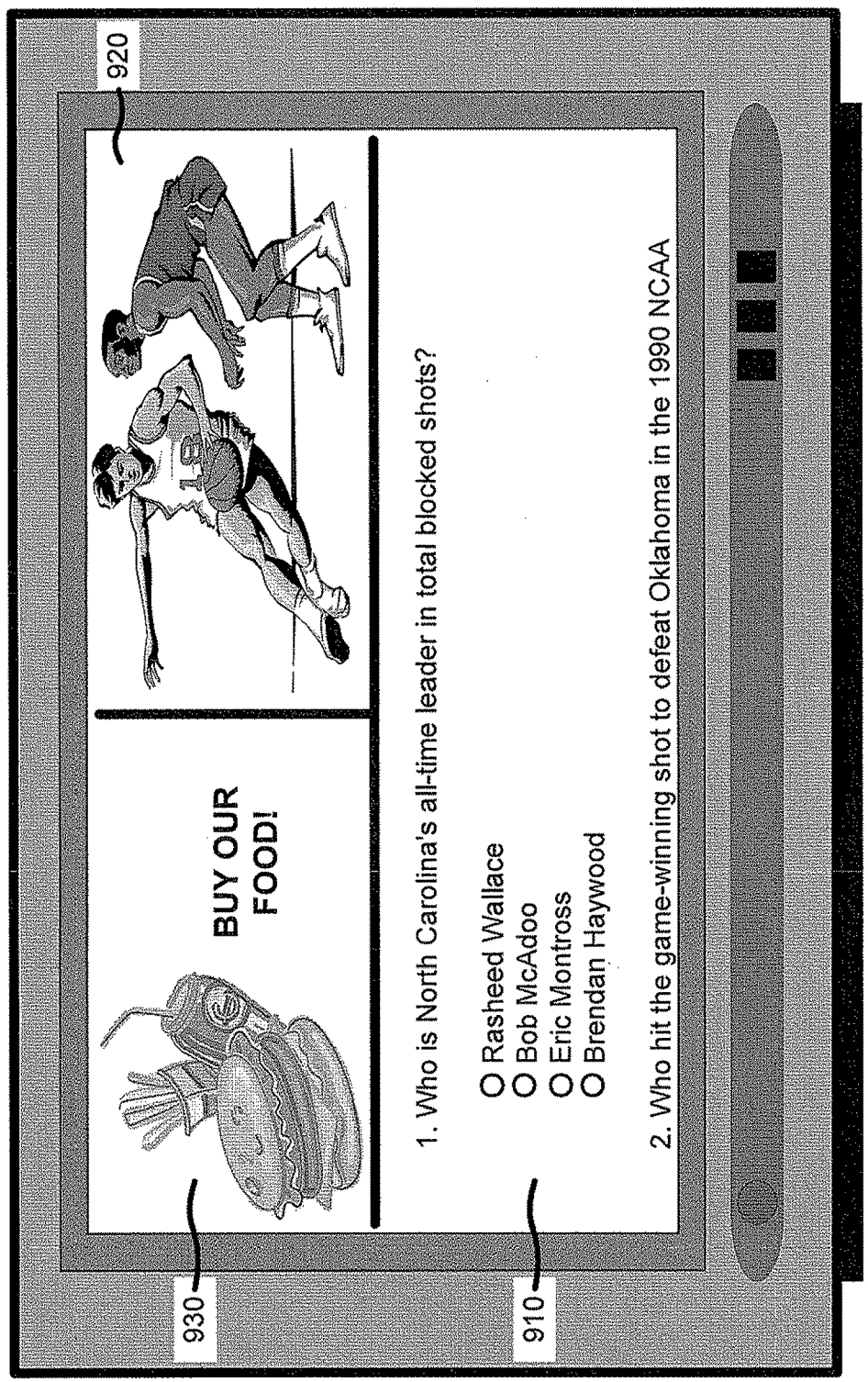
Figure 10:
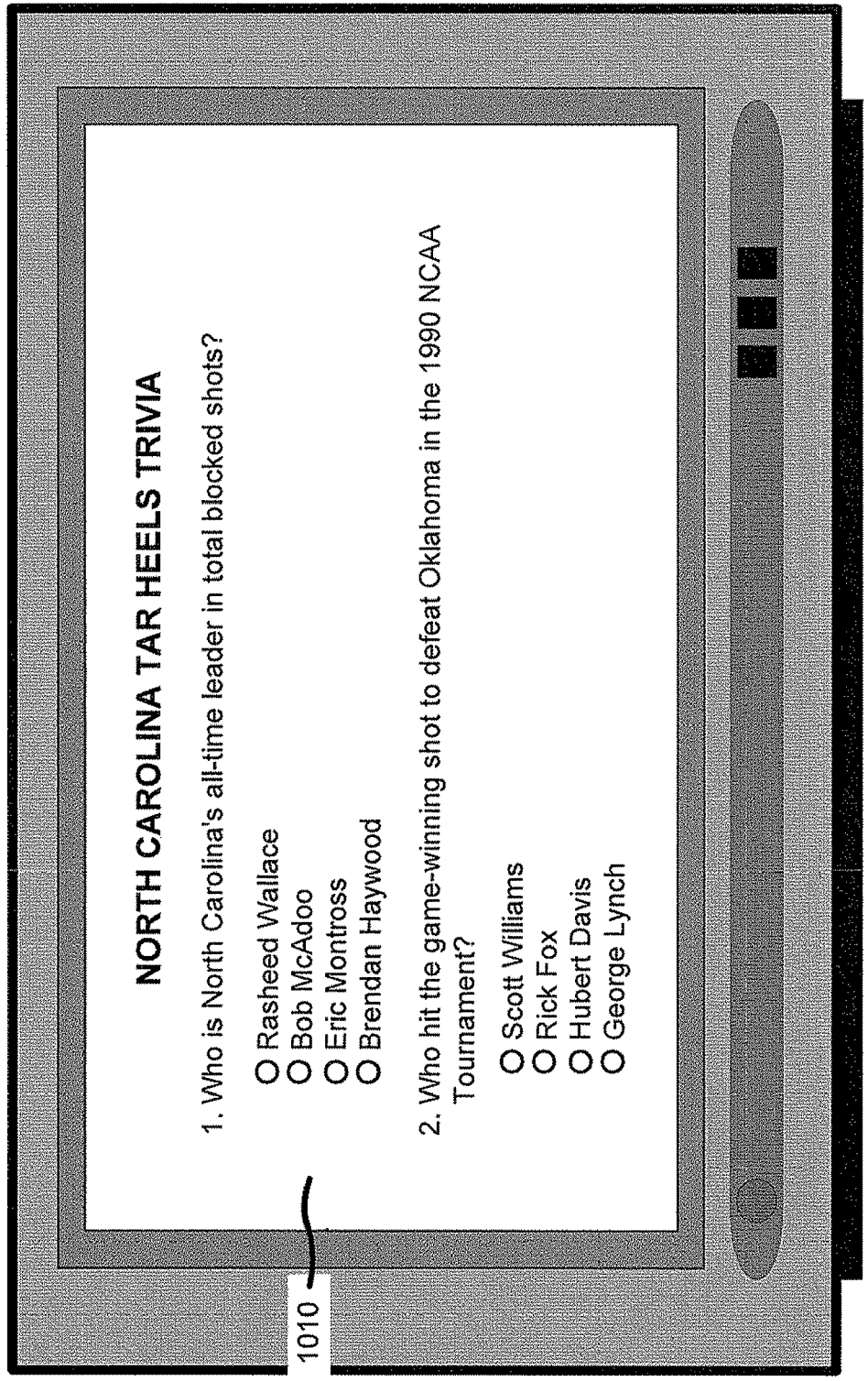

FIGS. 8-10 are diagrams of an exemplary trivia game that can be presented regarding a video program. Assume that a user sets her video client 260 (FIG. 2) to ESPN, which is currently playing a basketball game involving the North Carolina Tar Heels. Video client 260 may receive an enhanced media stream that includes the video signal corresponding to the basketball game and program meta-data relating to the game. Video client 260 may extract the program meta-data and send the data to a server (e.g., related content server 235) to perform a search for information related to the program meta-data. Alternatively, video client 260 may perform the search itself. Video client 260 may parse the search results to form snippets of information relevant to the program meta-data. In this situation, video client 260 may form snippets of trivia questions relating to the program meta-data.

Video client 260 may present one of the snippets on a video display device 265 via an information object. As shown in FIG. 8, video client 260 may present an information object 810 that provides a question regarding the North Carolina Tar Heels (e.g., the information object includes the question of: "In what year did North Carolina last win a national championship?"). Information object 810 may also provide an option 820 to play a trivia game (e.g., press OK to play), as shown in FIG. 8.

Assume that the user indicates that she desires to play the trivia game by pressing the OK button on her remote control 270. Video client 260 may present the user with a trivia game that may be presented within a portion of the screen of video display device 265 (FIG. 9), or may be presented to cover the entire screen of video display device 265 (FIG. 10). In other implementations, other presentations of the trivia game are possible.

As shown in FIG. 9, for example, video client 260 may partition the screen of video display device 265 into three windows 910-930. In window 910, video client 260 may present the trivia game. In window 920, video client 260 may continue to present the basketball game. In window 930, video client 260 may present an advertisement.

As shown in FIG. 10, video client 260 may present the trivia game so that the trivia game in a window 1010 that covers the entire screen of video display device 265. In this case, video client 260 may pause the presentation of the basketball game (e.g., begin recording the basketball game in memory).

The user may interact with the trivia game by pressing buttons on remote control 270. The user may play the trivia game alone or against others. For example, a server (e.g., related content server 235) may host the trivia game and collect answers from a group of users. In this case, the server may inform the user how the user has scored in comparison with other users currently (or previously) playing the trivia game.

In another implementation, the user may challenge a person to the trivia game. For example, the user may be able to challenge a member of the user's social group by pressing appropriate buttons on remote control 270. Video client 260 may present a list of potential players to the user based on the information in user profile database 250. If the user selects a member to challenge, video client 260 may access user profile database 250 to identify contact information for the member of the social group, and perhaps what that member is currently watching. The member may be notified of the challenge via a message on his/her television set. The member may accept, decline, or ignore the challenge. If the member accepts the challenge, then the member's video client 260 may present the member with the trivia game. If the member declines the challenge, then the server may notify the user's video client 260, which may inform the user via a message on video display device 265. If the member ignores the challenge (by, for example, not responding to the challenge within a particular amount of time), then the server may consider this as if the member declined the challenge and may notify the user via a message on video display device 265. The results of the challenge may be presented to both the user and the member via messages on their video display devices 265.

Implementations described herein may provide dynamic information related to program meta-data associated with a video program that a user is currently watching. While the preceding description generally described providing information regarding video programs as the video programs are being aired, this need not be the case. These implementations may equally apply to on demand content and recorded content (e.g., content recorded on a DVR). When recording a video program, for example, video client 260 may record both the video program and the program meta-data associated with the video program.

These implementations not only apply to a video program that a user is currently watching, but also to video programs that the user has viewed in the past. For example, information in user profile database 250 may be used to identify video programs in which the user is interested (e.g., based on the user's viewing habits). The information for the information objects may be associated with video programs in which the user is interested (regardless of which video program the user is currently watching).

These implementations not only apply to a video program that a user is currently watching, but also to video programs that air prior to and/or after the video program that the user is currently watching. For example, video client 260 may obtain program meta-data associated with these earlier/later video programs and present information regarding these video programs in the information objects (within the video program that the user is currently watching).

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 4, the order of the blocks may be modified in other implementations. Further, non-dependent blocks may be performed in parallel.

Also, various user interfaces have been described with regard to FIGS. 5-10. In other implementations, these user interfaces may include additional, fewer, different, or differently arranged items of information. Thus, implementations described herein are not tied to any specific arrangement of items of information on a screen of a video display device 265.

Further, it has been described that video client 260 extracts keywords from an enhanced media stream. In another implementation, video client 260 may obtain the keywords from another source, such as from a program guide or the like.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device connected to a video display device, the device comprising:
    an interface to receive a media stream that includes:
        a video signal associated with a video program, and
        program meta-data associated with the video program; and
    a processor, connected to the interface, to:
        parse the media stream to extract the program meta-data,
        identify a keyword based on the program meta-data,
        obtain information from a search performed using the keyword,
        create a plurality of snippets of information from the obtained information, each of the created snippets including a portion of the obtained information,
        receive a user profile that includes one or more meta-data items associated with a past viewing history of the user,
        assign a weight to each of the plurality of snippets based on whether a keyword, that was used to obtain the information for which the plurality of snippets were created, matches one or more meta-data items included in the user profile,
        a particular one of the snippets, matching a particular meta-data item included in the user profile, being assigned a higher weight than another one of the snippets, that does not match any meta-data items included in the user profile, and
        present the particular snippet and the other snippet to the video display device in an order that is based on the assigned weights, when presenting the particular snippet and the other snippet, the processor is to:
            present the particular snippet, and the video program to the video display device, the particular snippet and the video program being concurrently presented on the video display device, and
            present, after presenting the particular snippet, the other snippet and the video program to the video display device, the other snippet and the video program being concurrently presented on the video display device.

2. The device of claim 1, where the processor is further to remove the particular snippet from presentation on the video display device upon expiration of a threshold amount of time.

3. The device of claim 1, where the processor is further to present an option to turn off presentation of the particular snippet.

4. The device of claim 1, where the program meta-data is embedded in the media stream using Enhanced Television Binary Interchange Format (EBIF) technology, and
    when parsing the media stream, the processor is to use EBIF technology to extract the program meta-data from the media stream.

5. The device of claim 1, where the processor is to present each of the plurality of snippets to the video display device, where each of the plurality of snippets is presented for a particular amount of time.

6. The device of claim 1, where the weights indicate an order in which the plurality of snippets are presented on the video display device, and where the processor is further to:
    present, on the video display device, each of the plurality of snippets in the indicated order, based on the weights assigned to each snippet, of the plurality of snippets.

7. The device of claim 1, where, when presenting the particular snippet and the video program to the video display device, the processor is to present the particular snippet as a pop-up object overlaid on the video program.

8. The device of claim 1, where the processor is further to:
    present, on the video display device, an option to obtain additional information regarding the particular snippet,
    receive selection of the option,
    obtain, in response to the selection of the option, the additional information based on a search performed using information from the particular snippet, and
    present the additional information on the video display device.

9. The device of claim 1, where the processor is further to:
    present, on the video display device, an option to make a purchase relating to the video program,
    receive selection of the option, and
    present, on the video display device and in response to the selection of the option, an interface to facilitate the purchase.

10. The device of claim 1, where the processor is further to:
    present, on the video display device, along with the particular snippet, an option to participate in a trivia game relating to the video program,
    receive selection of the option, and
    present, in response to the selection of the option, the trivia game on the video display device.

11. The device of claim 10, where the processor is further to:
- present, to a user, a list of potential players to challenge to the trivia game,
- receive, from the user, selection of one of the players from the list,
- present, to the user, a list of questions relating to the trivia game,
- receive, from the user, answers to the questions, and
- provide, to the user, information regarding an outcome of the trivia game in relation to answers to the questions provided by the one of the players.

12. The device of claim 1, where, when obtaining the information from the search, the processor is to:
- transmit the keyword to a server over a network, the server performing the search to generate the information, and
- receive the information from the server.

13. A computer-readable medium that stores instructions executable by a processor, the instructions comprising:
- one or more instructions that, when executed by the processor, cause the processor to:
  - receive a media stream that includes a video signal associated with a video program and program meta-data associated with the video program;
  - parse the media stream to extract the program meta-data;
  - obtain information based on a search performed using a keyword associated with the program meta-data;
  - create a plurality of snippets of information from the obtained information;
  - assign a weight to each of the plurality of snippets based on whether a keyword, that was used to obtain the information for which the plurality of snippets were created, matches one or more meta-data items included in a user profile that includes one or more meta-data items associated with a past viewing history of a user;
  - present one of the plurality snippets and the video program to a video display device; and
  - replace the one of the plurality of snippets with another one of the plurality of snippets on the video display device,
  - the one of the plurality of snippets and the other one of the plurality of snippets being presented in an order that is based on the assigned weights.

14. The computer-readable medium of claim 13, the instructions further comprising:
- one or more instructions that, when executed by the processor, cause the processor to remove the one of the plurality of snippets from presentation on the video display device upon expiration of a threshold amount of time.

15. The computer-readable medium of claim 13, where the one or more instructions to present the one of the plurality of snippets and the video program to the video display device includes one or more instructions to present the one of the plurality of snippets as a pop-up object overlaid on the video program.

16. The computer-readable medium of claim 13, the instructions further comprising:
- one or more instructions that, when executed by the processor, cause the processor to:
  - present, on the video display device, along with the one of the plurality of snippets, an option to compete in a trivia game relating to the video program;
  - receive selection of the option; and
  - present, in response to the selection of the option, a question associated with the trivia game on the video display device.

17. A method comprising:
- receiving, by one or more video devices, a media stream that includes a video signal associated with a video program and program meta-data associated with the video program;
- parsing, by the one or more video devices, the media stream to extract the program meta-data;
- obtaining, by the one or more video devices, information based on a search performed using a keyword associated with the program meta-data;
- creating, by the one or more video devices, a plurality of snippets of information from the obtained information;
- assigning, by the one or more video devices, a weight to each of the plurality of snippets based on whether a keyword, that was used to obtain the information for which the plurality of snippets were created, matches one or more meta-data items included in a user profile that includes one or more meta-data items associated with a past viewing history of a user;
- presenting, by the one or more video devices, one of the plurality of snippets and the video program to a video display device; and
- replacing, by the one or more video devices, the one of the plurality of snippets with another one of the plurality of snippets on the video display device,
- the one of the plurality of snippets and the other one of the plurality of snippets being presented in an order that is based on the assigned weights.

18. The method of claim 17, where the replacing occurs after the one of the plurality of snippets has been presented for a particular duration of time.

19. The method of claim 17, where presenting the one of the plurality of snippets and the video program to the video display device includes presenting the one of the plurality of snippets as a pop-up object overlaid on the video program.

* * * * *